United States Patent [19]
Githens

[11] Patent Number: 4,566,979
[45] Date of Patent: Jan. 28, 1986

[54] STABLE MIXTURE OF CROSSLINKABLE COMPONENTS PROMPTLY ACTIVATABLE AS ACTING TREATING AGENTS

[75] Inventor: Charles J. Githens, 1604 N. Ridge Dr., Duncan, Okla. 73533

[73] Assignee: Charles J. Githens, Duncan, Okla.

[21] Appl. No.: 549,283

[22] Filed: Nov. 7, 1983

[51] Int. Cl.⁴ ................................................ C09K 3/00
[52] U.S. Cl. ........................... 252/8.55 C; 252/8.55 R; 525/370
[58] Field of Search ..................... 252/8.55 C, 8.55 R; 525/370

[56] References Cited

U.S. PATENT DOCUMENTS

| 3,267,083 | 8/1966 | Inhof | 525/370 |
| 4,324,668 | 4/1982 | Harris | 252/8.55 C |
| 4,477,360 | 10/1984 | Almond | 252/8.55 R |

FOREIGN PATENT DOCUMENTS

| 2055106 | 2/1981 | United Kingdom | 252/8.55 R |
| 2108122 | 5/1983 | United Kingdom | 252/8.55 R |

Primary Examiner—Prince E. Willis
Assistant Examiner—Willie J. Thompson
Attorney, Agent, or Firm—John H. Tregoning

[57] ABSTRACT

A dry mixture of a crosslinking compound and a hydratable gelling agent where said dry mixture is storable for at least three months during which time it is readily activatable to rapidly produce an active, high-viscosity acidic treating fluid.

10 Claims, No Drawings

STABLE MIXTURE OF CROSSLINKABLE COMPONENTS PROMPTLY ACTIVATABLE AS ACTING TREATING AGENTS

Acidizing and fracture acidizing procedures using acidic treating fluids are commonly carried out in subterranean well formations to accomplish a number of purposes, one of which is to increase the recovery of hydrocarbons therefrom. In acidizing procedures, acidic treating fluids are introduced into well formations under pressure so that the treating fluids flow into the pore spaces of the formations and react with materials contained therein, whereby the pore spaces are enlarged and the permeability of the formations is increased. In fracture acidizing procedures, one or more fractures are introduced into the fractures to etch flow channels therein and/or to enlarge the pore spaces in the fracture faces and in the formation.

Increasing the viscosity of an aqueous acid solution by the inclusion of certain hydrophilic materials therein, hereinafter referred to as "gelling agents", has been accomplished heretofore. In acidizing and/or fracture acidizing subterranean formations, high viscosity aqueous acid solutions are useful in preventing the acid from becoming prematurely spent and inactive. In addition, the high viscosity of the acid solutions enables the development of wider fractures so that live acid can be forced further into the formations, increases the proppant carrying capacity of the acid solutions, and permits better fluid loss control.

In addition to acidizing and fracture acidizing treatments, high viscosity acidic treating fluids are useful in carrying out subterranean well completions, for transporting sand in sand and gravel packing procedures and in various other well treating procedures. Also, high viscosity acidic treating fluids have utility in cleaning applications such as in the cleaning of tubular goods, production equipment, and industrial equipment. Equipment typically cleaned includes oil well piping tubes, tanks and process equipment, boilers, heat exchangers, conventional and nuclear power plants and accessory equipment and the like.

Hydratable gelling agents, such as partially hydrolized polyacrylamides, natural gums and modified natural gums, celluloses and xanthan polymers, have been utilized before to increase the viscosity of aqueous acid solutions. However, the gels produced with such gelling agents generally have limited stability in an acidic medium, i.e., the viscosity of the gelled aqueous acid silutions decreases substantially after only a short period of time. Chemicals which crosslink or complex hydrated gelling agents have also been utilized heretofore for further increasing their stability. For example, U.S. Pat. Nos. 3,888,312, 4,021,355 and 4,033,415 describe and claim organotitanate permanganate salts and antimony crosslinking agents respectively. U.S. Pat. No. 3,959,003 teaches the use of a water soluble cellulose complexed with a polyvalent metal salt as a thixotropic agent for cementing compositions. U.S. Pat. No. 3,979,303 teaches an oil well drilling fluid containing complex polysaccharides, and U.S. Pat. Nos. 4,313,834 and 4,324,668 disclose and claim acidic treating fluids of a hydratable gelling agent and a zirconium crosslinking agent which further increases the viscosity. Additionally, the acidic treating fluids established by such existing procedures, all exhibit the need for full production of said acidic treating fluids on site, or near site, immediately prior to performing the treatment.

Existing procedures for preparing acidic treating fluids require the gelling agent to be added to an aqueous fluid and allow the gelling agent to hydrate and thicken said fluid. The desired volume and concentration of said acid solution is then added to the total volume of said thickened fluid to form the thickened acid solution. At this time the viscosity of the thickened acid solution begins decreasing due to the destruction of gel structure by the acid. Thus this fluid must be crosslinked very quickly prior to a major reduction in viscosity, in order to obtain the desired rheological properties. To accomplish this, a solution of the crosslinking agent is added to the thickened acidic fluid as the thickened acidic fluid is being pumped into the wall being treated. The metal ions in the solution reacts with, and crosslinks, the gelling agent forming the crosslinked acidic fluid as it flows down the tubulars of the well and into the formation. The crosslinker solution contains a specific amount or percentage of active crosslinker, and must be proportioned very accurately to obtain the required properties of the crosslinked acid treating fluid.

During many fracturing and acidizing treatments performed in oil, gas or water wells, the rate of injection is not constant throughout. Thus with the thickened fluid injection, the required amount of crosslinker solution having a preselected crosslinker-to-solvent ratio must be added continuously to the thickened fluid in a very specific and constant proportion, to obtain the desired properties of the treating fluid. This often is very difficult since two sepatate pumps are required and must be synchronized to insure both fluids, i.e., thickened fluid and crosslinker solution are always of the desired ratio. The output of the pumps used to add the solution of crosslinker can vary with speed and pump wear, as well as, viscosity of the crosslinker solution. Crosslinker solutions can be more viscous during cold weather operations than during warm weather. These variations can result in crosslinked treating fluids that are more viscous or less viscous than desired, resulting in less benefit to the well being treated than anticipated. Minor variations in crosslinker to gelling agent ratio can often produce vastly different rheological properties of the treating fluid.

The dry form of crosslinkers currently in use for treating subterranean formations cannot be added to a dry powdered gelling agent and stored a reasonable time without undergoing a reaction affecting the quality of the gelling agent and the activity of the crosslinker. A reaction occurs in such a dry blend state within a relatively short period of time, generally less than one or two weeks and in many instances being selfinitiated within minutes, which renders the dry blend ineffective, for thickening an aqueous fluid. Also, when a dry blend combination of gelling agent and currently used crosslinkers are added to the aqueous medium, the gelling agent begins to hydrate and simultaneously the crosslinker ionizes, releasing the metal ion. This results in a partially hydrated, crosslinked gelling agent and the treating fluid so prepared does not obrain the desired rheological properties. For this and other reasons, the existing workable procedure has been to defer the addition of crosslinking compound to the gel containing the hydrated gelling agent, just prior to the need of such required crosslinkage to obtain the necessary and usable crosslinking activety to produce the intended readily workable acidic treating fluid.

The present invention is two fold in that it initially provides the much sought-after dry crosslinking composition, i.e., the SC-Composition or SC, which is freely capable of being mixed with a particular hydratable gelling agent, i.e., an SH-Agent or SH, to now finally establish a dry, activatable mixture of said crosslinking composition and said hydratable gelling agent, i.e., SCSH-Mixture or SCSH, which is both initially and through lengthy storage, fully effective in crosslinking, with the addition of water to quickly gel the hydratable gelling agent to form the SCSH-Gel, followed by the addition of an acidic aqueous solution to quickly effect the crosslinking activity within the SCSH-Gel to quickly produce the desired acidic treating fluid, i.e., the CXH-Gel.

The SC-Composition of this invention comprises a dry finely divided powered pulverulent form of a multivalent metal salt, or mixtures thereof, which does not release its crosslinkable multi-valent metal ion at a pH greater than about 7, mixable, and reaction free, with a dry powered, hydratable SH-Agent, which is capable of being crosslinked with said SC-Composition and said dry mixture capable of being most favorably stored while retaining both gelling and crosslinking activities for at least three months, preferably six months and most preferably nine months, when storage takes place in a moisture free container.

An example of SC-Composition is defined as a multi-valent metal salt of a carboxylic acid or a metal carboxylate or preferably a zirconium carboxylate or still more preferably a zirconium octoate, such as Mooney Chemical Company's Catalyst 435. Another example of such metal carboxylate is zirconium lactate, for example, Zirconium Technology Corporation's Zirtech V.

The acidic treating fluid of this invention can be prepared by adding the desired amount of the dry SCSH-Composition to non-acidic water and allowing the hydratable gelling agent, i.e., the SH-Agent, of the SCSH-Composition, to hydrate and thicken the water. The further addition of sufficient volume and strength of acidic aqueous solution to reduce the pH of said thickened water to less than about 7, causes the crosslinker, i.e., the SC-Composition of the SCSH-Gel, to release sufficient metal ions to initiate crosslinking of the hydrated SCSH-Gel, resulting in the desired increase in viscosity. The amount of acid required to initiate such crosslinking can be as little as about 0.01% to about 20% acid in the acidic treating fluid. Initiation of said crosslinking should occur in less than about 2 minutes and preferably less than about 30 seconds, after addition of the desired amount of aqueous acidic solution to the thickened non-acidic water.

Prior to the addition of the crosslinking activating acidic aqueous solution, the SCSH-Gel can be maintained for up to several days without a substantial increase in viscosity due to release of metal ions from the SC-Composition dispersed in the SCSH-Gel having a pH above about 7. The reduction in pH of the SCSH-Gel to a value less than about 7, causes a rapid release of metal ions from the SC-Composition to effect crosslinking of the SH-Agent and rapid viscosity increase of the thickened water.

The addition of an amount of acid in excess of the amount required in the acidic aqueous liquid, to initiate crosslinking of the thickened water will not appreciably change the useful rheological properties of the crosslinked acidic treating fluid unless an excess of water solvent in the acid solution results in a severe dilution of the thickened water substantially reducing the concentration of SH-Agent in the treating fluid. Those skilled in the art of fracturing or acidizing with thickened or crosslinked fluids will recognize the importance of maintaining sufficient SH-Gelling agent in the treating fluid to generate the required viscosity to effectively treat a subterranean formation to increase production therefrom.

The use of SCSH-Composition or mixture, will hereby result in producing a consistent crosslinked acidic treating fluid, even though the ratio of activating acid solution to thickened non-acidic water varies over a wide range as long as the pH is reduced sufficiently to effect release of metal ions from the dispersed SC-Composition in the SCSH-Gel.

The crosslinked CXH-Gels of this invention, i.e., the crosslinked gels, are more stable at higher temperatures than non-crosslinked fluids and have a viscosity at least equal to the viscosity of existing crosslinked gels. For example, a typical crosslinked CXH-Gel of the invention may be stable when prepared with hydrochloric acid up to about 180 degrees F. and the same prepared with formic acid may be stable up to about 200 degrees F., and up to about 220 degrees F. when acetic acid is used. Likewise, the stability can be higher for a mixture of acids having a high total acid concentration. Stability means that although the gel begins breaking when the acid is added, the gel-acid composition, i.e., the acidic treating fluid, has a useful life under given conditions of tempereture and acid concentration and temperature, as well as, any special contaminants or conditions of use.

The hydratable gelling agents, i.e., the SH-Agents, which are suitable for use in accordance with the present invention are those hydrophilic organic polymers having a molecular weight of greater than 100,000 and containing some carboxyl functionality whereby they can be crosslinked with metal ions, such as water soluble synthetic polymers including homopolymers, copolymers and those polymers containing one or more repeating polymeric units and substituted polysaccharides. Examples of such polymers are substituted natural gums, acrylamides, methacrylamides, acrylates, methacrylates, maleic anhydrides, alkylvinyl ethers, vinyl alcohols and xanthan polymers. Polymers or copolymers of those units should contain functional groups. The polymer units or substituents can include carboxyl groups, hydroxyl groups, and alkyl groups and combinations thereof having from one to about three carbon atoms which may be connected through other substituents such as oxygen and nitrogen.

The particularly preferred hydratable gelling agents, specifically SH-Agents, are carboxymethyl hydroxyethyl cellulose (CMHEC) having a degree of substitution (DS) in the range of from about 0.1 to 1.0 and a molar substitution (MS) in the range of about 0.5 to 5, carboxymethyl hydroxypropyl guar (CMHPG) having a DS in the range of from about 0.005 to 0.5 and a MS in the range of from about 0.01 to 1.0 carboxyethyl hydroxypropyl guar (CEHPG) having a DS in the range of from about 0.01 to 0.5 and a MS in the range of from about 0.01 to 1.0, polyacrylamides and polymethacrylamides which are hydrolized in the range of from about 1% to about 10% and xanthan polymer. The most preferred SH-Agents are carboxymethyl hydroxyethyl cellulose (CMHEC) having a DS of about 0.25 to 0.6 and a MS of about 1.0 to 3.0 and carboxymethyl hydroxypropyl guar (CMHPG) having a DS of 0.05 to 0.2 and a MS of 0.1 to 0.5, and carboxy methyl cellulose (CMC) having a DS of about 0.82 to about 1.5.

At higher DS values, the base gel may be sensitive to some multi-valent ions. At lower DS values the crosslinking may be harder to detect. In some cases other substituents or equivalents can be used and these should be considered within the appropriate ranges indicated herein.

When a hydrophilic organic polymer of the SH-Agents of the type described above or mixtures of such polymers are hydrated in an aqueous fluid and crosslinked by applicable SC-Composition or mixtures thereof, are hydrated in an aqueous fluid and crosslinked by applicable SC-Composition in the presence of acid, at a pH which will activate said SC-Composition, a highly viscous crosslinked gel, CXH-Gel, is produced which can have high temperature stability. A pH below about 5 is prefered in that at such pH the crosslinking reaction takes place rapidly.

An acidic crosslinked treating fluid, i.e., the CXH-Gel, is prepared for treatment of a limestone formation at about 4,200 feet in a well in West Texas. The job is designed to inject about 12,000 gallons of a crosslinked acidic treating fluid containing 10% hydrochloric acid at a rate of 15 barrels per minute down 5½ inch casing into perforations at 4,220 to 4,250 feet. The SCSH-Mixture (dry) contains about 85% by weight CMHEC and 15% by weight of Mooney Chemical Co. Catlyst 435, a zirconium octoate composition.

The thickened non-acidic water is prepared by adding 600 pounds of SCSH-Mixture to about 8,000 gallons of non-acidic water by circulating the water from a 500 barrel storage tank through a fracturing blender back into the 500 barrel storage tank while adding the SCSH at the blender. Slow circulation continues for 15 to 20 minutes after addition of SCSH until the SH-Gelling agent has hydrated to establish the SCSH-Gel.

The prepared SCSH-Gel is then pumped by primary treating pumps at about 10.0 barrels per minute from the blender to the well, while about 5.0 barrels per minute of a 28% hydrochloric acid solution is pumped with a different pump into a common discharge line from the primary treating pumps. Mixing of the acid with the thickened non-acidic water occurs in the discharge line, reducing the pH of the thickened non-acidic water necessary to form the CXH-Gel, i.e., the crosslinked acidic treating fluid containing about 10% hydrocloric acid. Flowmeters are used to help control the rate from both pumping systems. Preliminary tests indicate that said crosslinking shall occur in about 9 seconds; therefore, the CXH-Gel, i.e., the acidic treating fluid, shall be crosslinked by the time it reaches the perforations. Previous tests show that a variation of ±50% in the addition rate of the 28% hydrochloric acid, i.e., 2.5BPM to 7.5 BPM, did not appreciably change the rheological properties of the crosslinked acidic treating fluid, i.e., CXH-Gel.

Another well treatment is performed in a clay containing sandstone formation in which a fracturing fluid is to be a crosslinked weak acid of pH about 4.0, in order to protect against excessive formation damage from the clay minerals. Since no appreciable acid soluble minerals are present in the formation, there is no need to treat with a highly reactive acid solution.

A 30,000 gallon fracturing treatment is designed in which a 10,000 gallon pad of the same composition as the proppant containing fluid is to precede the proppant containing fluid. 20,000 pounds of 20/40 sand is to be used in the treatment. Treatment is to be down 3½ inch drill pipe at 20 barrels per minute and displaced to the perforations by formation water.

Preliminary tests with the water available for use show that a crosslinked acidic treating fluid containing 0.1% hydrogen chloride would have a pH of about 2.8. About 30,000 gallons of water is thickened with 1,500 pounds of SCSH in the same manner as for the previous treatment, to produce the SCSH-Gel. 10,000 gallons of the SCSH-Gel is pumped from the storage tanks through the blender to the well head while proportioning about 155 gallons, 28%, hydrochloric acid into the discharge line from the treating pumps. The pump rate for the 28% hydrochloric acid is 0.06 barrels per minute(2.5gal/min.) and the thickened non-acidic water is pumped at about 20 barrels per minute to form the CXH-Gel. After the pumping of the 10,000 pad, the 20/40 sand is proportioned through the blender into the SCSH-Gel at the desired ratio. No change in the rate of either the SCSH-Gel or the crosslinking activating acid solution is made during the remainder of the fracturing treatment, i.e., while the proppant is being transported in the treating fluid. The SCSH used in this treatment consists of a dry blend of 97% by weight of CMC and 3% by weight of zirconium lactate.

What is claimed is:

1. A storable dry mixture of readily activatable crosslinking components, said components comprising a dry, powdered mixture of SC-Composition and SH-Gelling Agent, said components made quickly activatable by addition of non-acidic water to form a gel, storable for at least a day, and the addition of acidic aqueous solution to effect quick crosslinking to form an active acidic treating fluid.

2. the mixture of claim 1, wherein said SC-Composition is selected from the group consisting of a multi-valent metal salt of a carboxylic acid and mixtures thereof.

3. The mixture of claim 2, wherein said multi-valent metal salt of a carboxylic acid is a zirconium carboxylate.

4. The mixture of claim 3, wherein said zirconium carboxylate is selected from the group consisting of zirconium octoate and zirconium lactate.

5. The mixture of claim 1, wherein said SC-Composition is a metal salt of a carboxylic acid.

6. A detainable method of preparing an acid treating fluid, said method comprising forming a dry pulverulent, powdered mixture and crosslinking SC-Composition and SH-Gelling Agent, said dry mixture being storable and retaining measurably full crosslinking action for at least three months, during which time the adding of non-acidic water to said mixture is made to form a SCSH-Gel of a pH greater than 7 and stable for at least one day, followed by the addition of acidic aqueous solution to readily activate said crosslinking gel to rapidly produce said acidic treating fluid.

7. The method of claim 6, wherein said SC-Composition is selected from the group consisting of a multi-valent metal salt of a carboxylic acid in a zirconium carboxylate.

8. The method of claim 7, wherein said zirconium carboxylate is selected from the group consisting of zirconium octoate and a zirconium lactate.

9. The method of claim 6, wherein said SC-Composition is a metal salt of a carboxylic acid.

10. A storable crosslinkingly activatable dry mixture capable of quickly crosslinking to form an aqueous acidic treating solution, said mixture comprising a powdered, dry mixture of a multi-valent metal salt and a dry SH-Gelling Agent, said mixture being made activatable by addition of a non-aqueous solution media having a pH above 7 to form a gel readily accomplish said gels release of metal ion quickly effecting crosslinking to establish an activatable acidic treating fluid of high viscosity.

* * * * *